United States Patent
Du et al.

(10) Patent No.: US 6,744,170 B1
(45) Date of Patent: Jun. 1, 2004

(54) BRUSH ASSEMBLY

(75) Inventors: Hung T. Du, Reisterstown, MD (US); Todd A. Hagan, Windsor, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/019,871

(22) Filed: Feb. 6, 1998

(51) Int. Cl.$^7$ .................. H01R 39/38; H01R 39/40; H01R 39/36; H01R 39/46
(52) U.S. Cl. .................. 310/242; 310/220; 310/246; 310/249
(58) Field of Search ................ 310/239, 248, 310/249, 251, 245, 246, 240, 241, 242, 243, 244, 247, 220

(56) References Cited

U.S. PATENT DOCUMENTS

| | | | |
|---|---|---|---|
| 1,396,451 A | 11/1921 | Merk | 310/239 |
| 1,970,604 A | 8/1934 | Henry | 310/239 |
| 2,194,620 A | 3/1940 | Sekyra | 310/239 |
| 2,474,601 A | 6/1949 | Thomas | 310/239 |
| 2,615,939 A | 10/1952 | Mitchell | 310/239 |
| 2,695,968 A | 11/1954 | Welch et al. | 310/246 |
| 2,802,960 A | 8/1957 | Baker | 310/246 |
| 3,108,201 A | 10/1963 | Summerfield | 310/247 |
| 3,480,814 A | 11/1969 | Amrein | 310/247 |
| 3,656,018 A | 4/1972 | Maher | 310/242 |
| 3,955,113 A | * 5/1976 | Hillyer et al. | 310/239 |
| 4,354,128 A | 10/1982 | Chew et al. | 310/242 |
| 4,593,220 A | * 6/1986 | Cousins et al. | 310/239 |
| 4,843,274 A | * 6/1989 | Paisley | 310/239 |
| 5,198,712 A | 3/1993 | Bolzan, Jr. et al. | 310/242 |
| 5,664,634 A | * 9/1997 | McCracken | 173/48 |
| 5,714,826 A | * 2/1998 | Furukawa et al. | 310/251 |
| 5,717,271 A | * 2/1998 | Aoki et al. | 310/242 |
| 5,907,207 A | 5/1999 | Peot et al. | 310/245 |
| 6,031,313 A | * 2/2000 | Sugai et al. | 310/239 |

FOREIGN PATENT DOCUMENTS

GB 392204 5/1933

* cited by examiner

*Primary Examiner*—Nestor Ramirez
*Assistant Examiner*—Dang Dinh Le
(74) *Attorney, Agent, or Firm*—Harness, Dickey & Pierce, P.L.C.

(57) ABSTRACT

A brush assembly for an electric motor has a base which secures the brush assembly to a motor spider. A brush housing is associated with the base and has first and second open ends. A brush defining an axis is movably positioned in the housing between the first and second open ends. The brush extends from one of the open ends of the housing. The brush includes a surface which is at a desired angle with respect to the brush axis. A biasing member exerts a force on the brush to bias the brush into an electrical connection with a commutator. An electrical connector electrically couples the brush to provide an electrical connection between the commutator and a power supply.

14 Claims, 5 Drawing Sheets

BRUSH ASSEMBLY

BACKGROUND OF THE INVENTION

The present invention relates to electric motors and, more particularly, to brushes and brush assemblies.

Electric motors are used in various applications, as well as in a number of work-related areas. One area where small electric motors are utilized is in power tools. A brush is an integral part in transmitting power between a commutator and a power supply.

Various types of mountings which have springs are utilized to exert a force on the brush. The effectiveness of the brush and wear on the brush is decreased when the brush is subjected to arcing. Arcing is inherently present when the brush has a tendency to bounce or move away from the commutator and the brush hits irregularities over rough spots.

SUMMARY OF THE INVENTION

Accordingly, it is an object of the present invention to provide the art with a brush and brush assembly which will provide a substantially constant force on the brush. The present invention provides a brush which enables a spring to exert a constant force onto the brush to reduce wear. The brush includes a surface where the resultant spring force applied on the surface, by the assembly spring, is substantially the same throughout the life of the brush. Also, a stop is present on the brush which prohibits undue wear on the brush by prohibiting further travel of the brush towards the commutator. This likewise prevents the shunt wire from engaging the commutator damaging the commutator surface. Further, the stop prohibits the spring from dislodging from the end of the brush.

In accordance with one aspect of the invention, a brush assembly for electric motors comprises a base, the base includes a member for securing the base with a motor spider assembly. A brush housing is associated with the base. The brush housing has first and second open ends. A brush, defining an axis, is movably positioned in the housing between the first and second open ends. The brush extends from one of the open ends of the housing. The brush includes a surface which is at a desired angle with respect to the brush axis. A biasing member exerts a force on the brush. The brush is biased into electrical connection with a commutator. An electrical connector electrically couples with the brush to establish an electrical connection between the commutator and a power supply. Also, the brush includes a recessed portion with the recessed portion including the surface. The brush also includes a stop adjacent to the recessed portion. The housing includes an axial slot in which the stop projects to prohibit further movement of the brush in the housing. The surface is at an angle greater than zero with respect to a plane tangent the brush axis. Preferably, the angle is greater than zero to about ten degrees. The angle is such that the biasing member applies substantially constant force on the brush as the brush wears during use.

In accordance with a second aspect of the invention, a brush for an electric motor comprises a body having a desired configuration adapted for associating with a brush housing. The body defines an axis. A surface is on the body. The surface is on a desired angle with respect to a plane transverse to the axis. Also, the surface is at a terminal end of the body. The angle of the surface is greater than zero. The surface enables a spring force to be exerted on it such that the force is substantially constant as the brush wears. The brush also includes a recessed portion which includes the surface. The brush is a desired cross-sectional configuration and the recessed portion is positioned between a pair of members which extend from sides of the cross-sectional configuration. The angle of the surface is between greater than zero degrees to about ten degrees. A stop is unitarily formed on the brush. The stop is adjacent the recessed portion. The recessed portion extends a desired distance across the brush forming a second recess adjacent the recessed portion. An electrical contact is secured with the brush in the second recess.

In accordance with a third aspect of the invention, a power tool utilizes an electric motor with the above described brush assembly.

Additional objects and advantages of the invention will be apparent from the detailed description of the preferred embodiment, the appended claims and accompanying drawings, or may be learned by practice of the invention.

BRIEF DESCRIPTION OF THE DRAWINGS

The accompanying drawings, which are incorporated in and constitute a part of the specification, illustrate one embodiment of the present invention and together, with the description, serve to explain the principals of the invention. In the drawings, the same reference numerals indicate the same parts.

DETAILED DESCRIPTION OF THE PREFERRED EMBODIMENT

Figure 1:
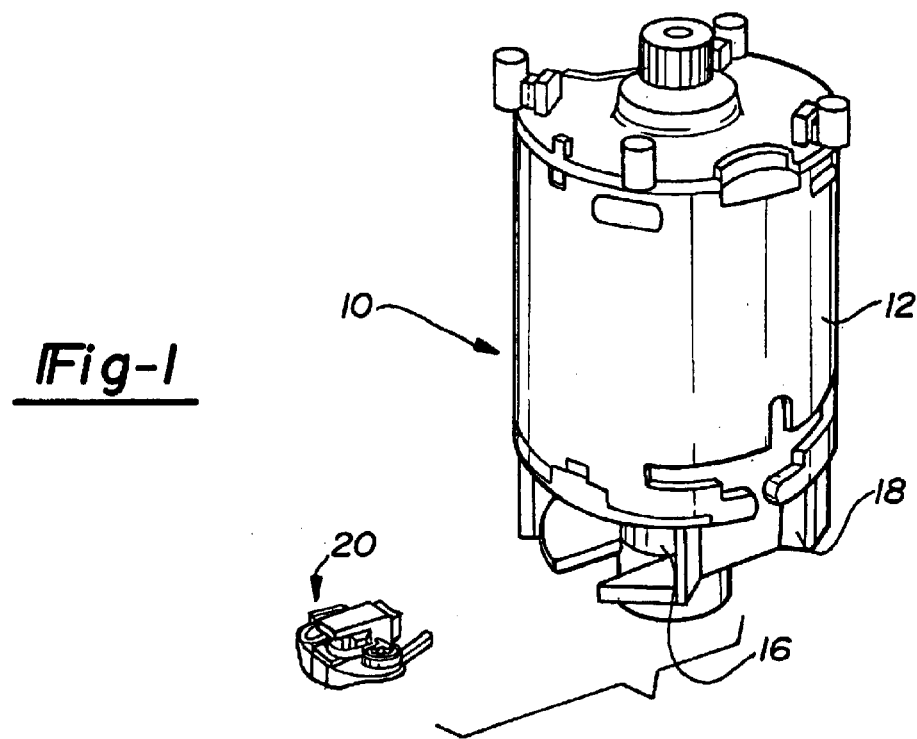
FIG. 1 is a perspective view of a motor including a brush assembly in accordance with the present invention.
Figure 2:
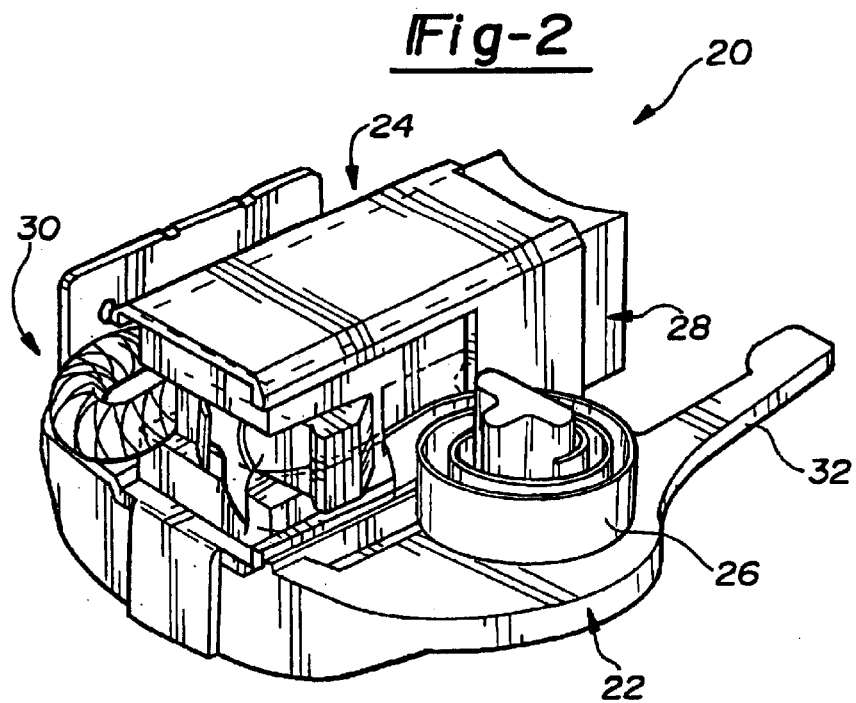
FIG. 2 is a perspective view of the brush assembly in accordance with the present invention.

Turning to the figures, FIG. 1 illustrates a motor removed from a power tool housing and is designated with the reference numeral 10. The motor includes a base 12, windings (not shown), commutator 16 and a spider 18. A brush assembly 20 is illustrated to couple with the motor spider 18.

The brush assembly 20 includes a base 22, a housing 24, a spring 26, a brush 28 and an electrical connection 30. The base 22 is preferably a non-metallic member having a pair of arms 32 and 34 to secure the base 22 with the motor spider 18. Also, the base includes a web 36 which connects the two arms 32 and 34. The web includes a recess 38 which receives the housing 24. The housing 24 is secured in the recess 38 by flaps 25 which are bent under the base 22 to secure the housing 24 with the base 22.

The housing 24 includes an open cylindrical member 40 having a rectangular cross-section. The cylinder has opened ends 42 and 44, the end 42 being adjacent the commutator 16. Slots 46 and 48 are positioned on sides 50 and 52 and extend from open end 44. The slots 46 and 48 enable the spring 26 and electrical connector 30 to move with the brush 28. Also, a unitary shunt connection member 60 and connector 62 are formed with housing 24. The connector 62 enables an electrical contact to be coupled with the housing 24. Also, the connection member 60 has a cutout 61 which interacts with tab 63 to enable positioning of the housing 24 on the base 22.

The spring 26 is wound about a post 54 extending from the base plate 22. The post 54 may be angled off center with respect to the axis of the base 22. The spring 26 applies a force onto the brush 28. The electrical connector 30 is known in the art as a pigtail connector or shunt. The end of the pigtail shunt is ultrasonically welded to the connection member 60.

The brush 28 has a body portion 70 with a pair of ends 72 and 74. The body has an overall rectangular cross-section. The end 72 is arcuate having several raised and recessed portions 76 and 78 which abut the commutator 16. The end 74 includes a recessed portion 80 between a pair of walls 82 and 84. The walls 82 and 84 are spaced from one another such that the end of the spring 26 is trapped between the walls 82 and 84 and rides on the surface 86.

The recessed portion 80 defines a bottom surface 86. The surface 86 is angled with respect to a plane transverse to the longitudinal axis 88 of the brush 28. The surface 86 is on an angle greater than zero to about ten degrees. Preferably, the surface 86 is angled between greater than zero to about five degrees. The angle of the surface 86 is such that the spring 26 applies a substantially constant force on the brush 28 as the brush wears during use. A second recess 90 is formed adjacent the first recess 80. The second recess 90 is deeper and includes a surface 92 where the pigtail 30 enters the brush 28.

Figure 3:
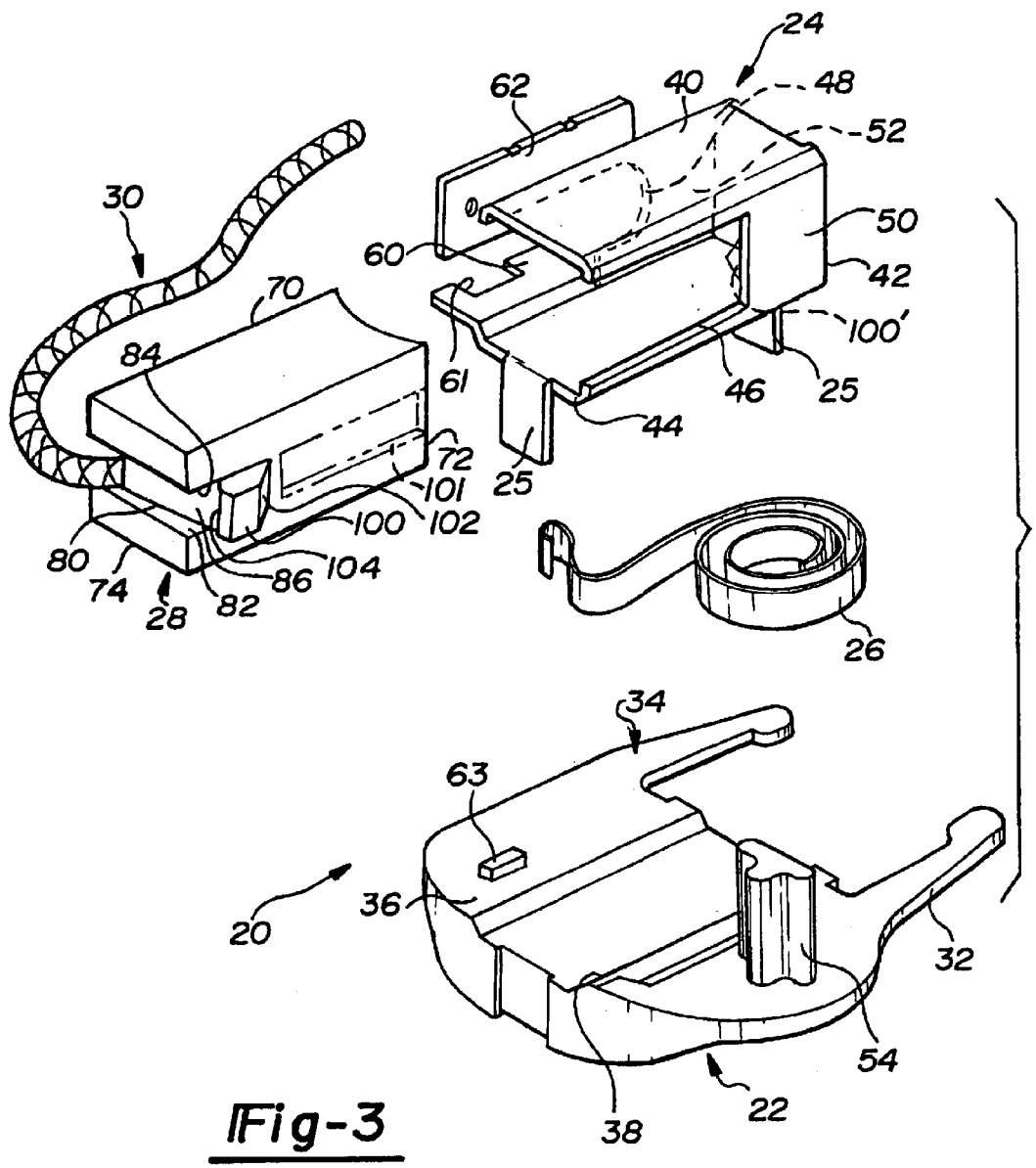
FIG. 3 is an exploded view of the brush assembly in accordance with the present invention.
Figure 4:
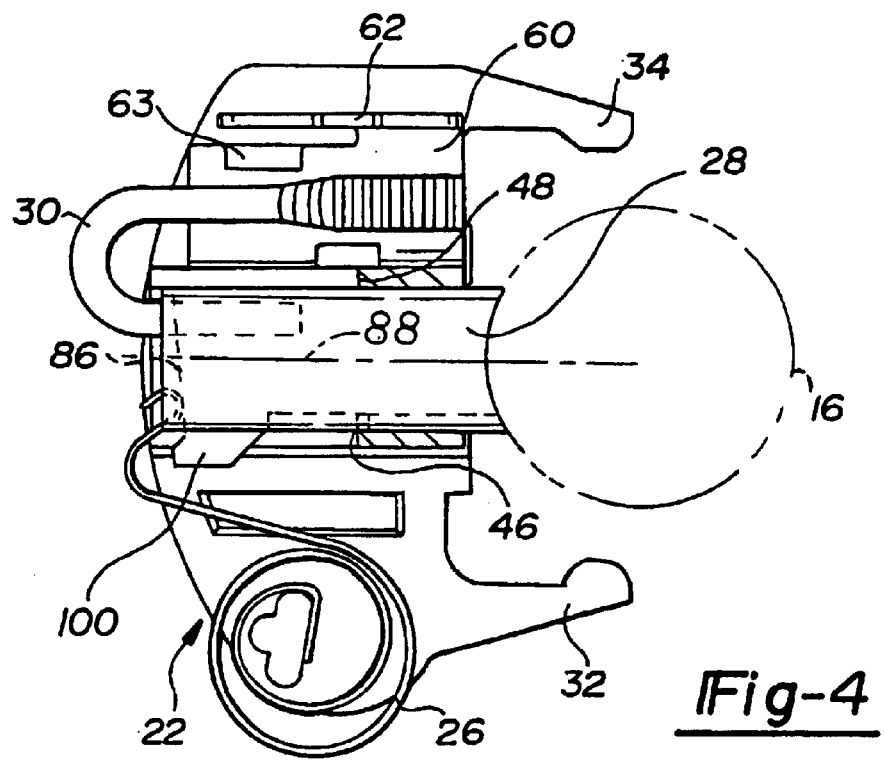
FIG. 4 is a plan view of the brush assembly in accordance with the present invention commutator shown in phantom in a first position.

A stop 100 extends from the brush 28. The stop 100 has a width equal to that of the recessed portion surface 86. The stop 100 has an angled end 102 which abuts the bottom of housing slot 46 when the brush 28 becomes worn. Also, the stop 100 includes a surface 104 which acts to retain the spring end in the recess. Accordingly, the spring end is prevented from dislodging from the brush 28. The stop 100 also prohibits the shunt from further travel in the housing to prevent the shunt tip from engaging the commutator and damaging the commutator surface. Further, during the automated assembly process, the stop 100 provides an alignment feature as well as a retention feature by prohibiting the brush from further movement toward to commutator. Additionally, as shown in phantom in FIG. 3, the stop 100' may be a bent portion extending from the housing 24 and a groove 101 may be in the brush 28 eliminating the projecting stop 100.

The recessed portion bottom surface 86 enables the spring end to ride in the recess to provide constant contact with the brush 28. This constant contact provides the force which, due to the angle of the surface, provides a substantially constant force on the brush during wear of the brush. The constant force eliminates bouncing of the brush and therefore increases the brush wear and prohibits damage to the commutator. Also, it is preferred that the spring end, as it is applying the force, be as close to the brush as possible. This enhances the application of the constant force on the brush.

Since the brush has a simple design, it can easily be assembled with the brush assembly by an automated process. Also, the brush assembly may easily be assembled with the motor by an automated process.

Figure 7:
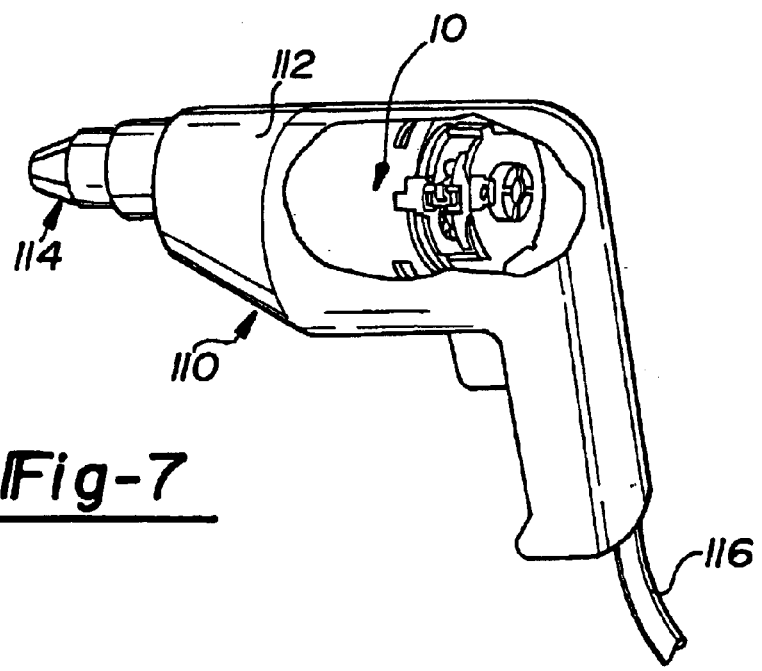
FIG. 7 is a perspective view of a power tool with a motor like FIG. 1.

FIG. 7 illustrates a power tool 110, such as a drill motor. The power tool 110 includes a housing 112 which receives a motor 10, which is described above. Also, the power tool 110 includes an output member 114, in this case a chuck. A power cord 116 is coupled with the power tool 110 to supply power. Also, the tool 110 may be battery operated.

Figure 5:
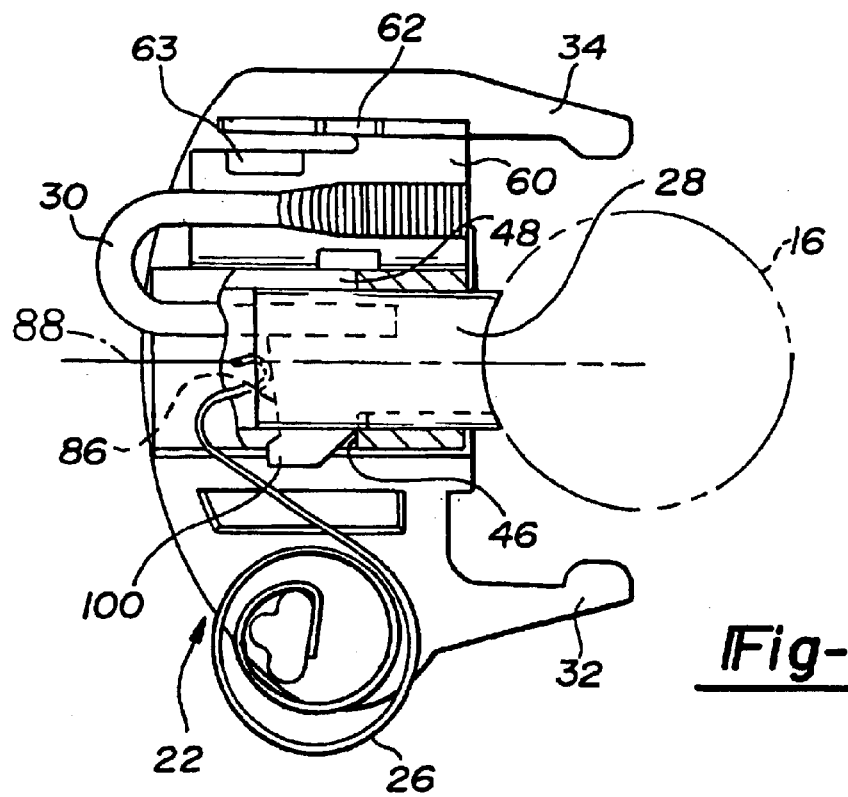
FIG. 5 is a figure like that of FIG. 4 with a worn brush.
Figure 6:
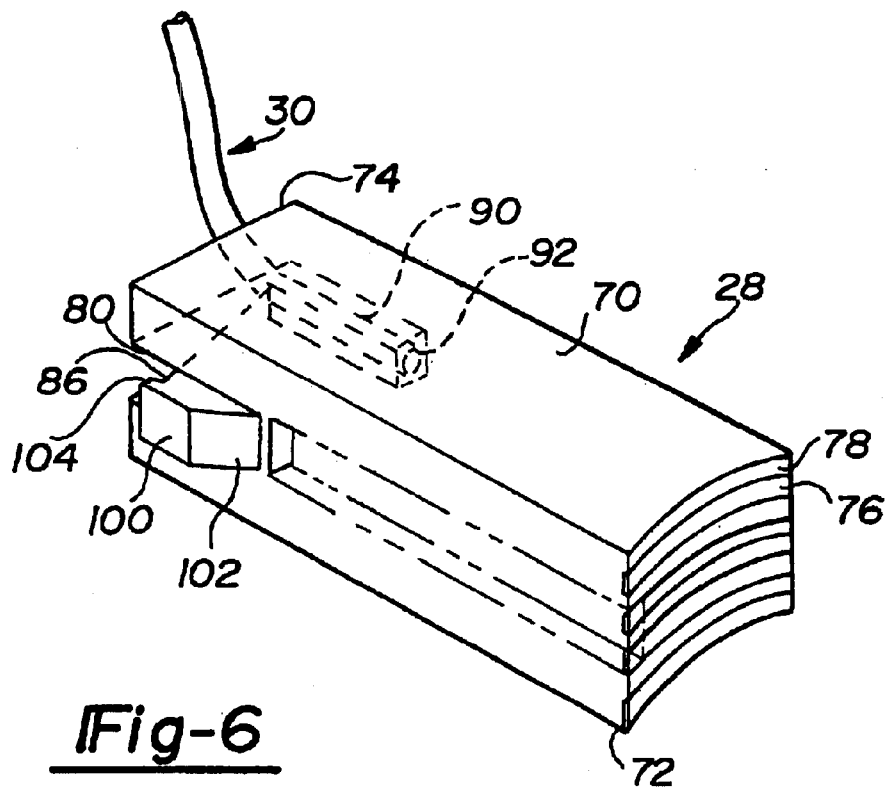
FIG. 6 is a perspective view of a brush in accordance with the present invention.
Figure 8:
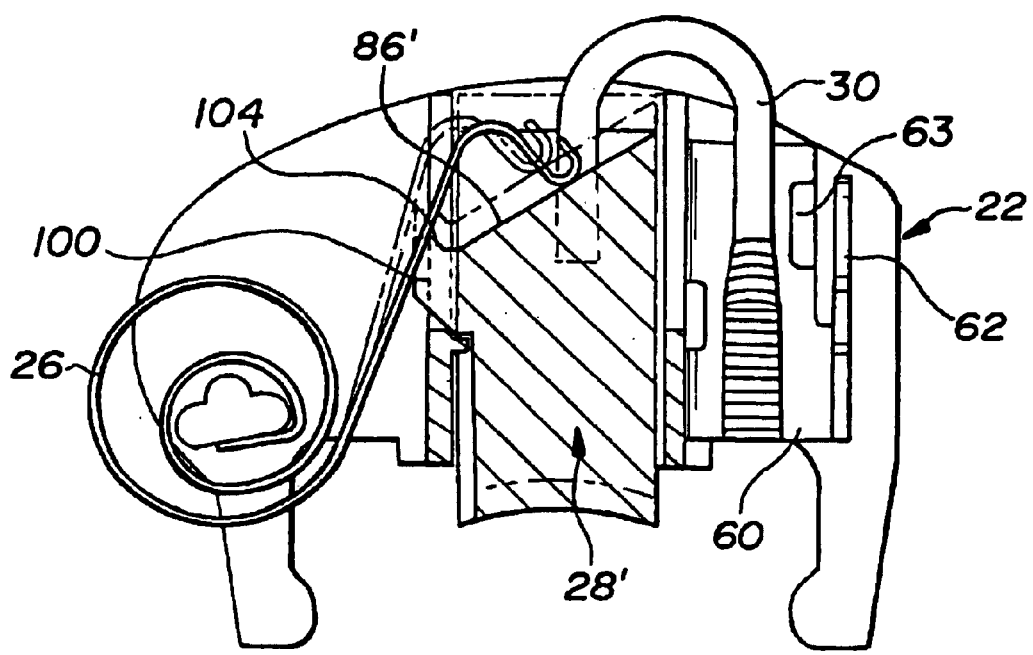
FIG. 8 is a view like FIG. 5 of a second embodiment of the present invention.

FIG. 8 illustrates a second embodiment of the present invention FIG. 8 is similar to that of FIG. 5, with the brush 28' as the only element which is different in this embodiment. Accordingly, the other features are marked with identical reference numerals.

The brush 28' is the same as that previously illustrated, except that the surface 86' is on an angle substantially steeper than that of the above design. Here, the angle is between 20° to 40°. Preferably, the angle is about 30°. Thus, the present invention enables a bottom surface 86' that can be angled at various positions to enable the constant application of force onto the commutator. As can be seen in phantom, the spring is near the axis of the brush as it moves from a beginning position to a worn position.

It will be apparent to those skilled in the art that various modifications and variations may be made in the brush assembly of the present invention without departing from the scope or spirit of the present invention. Thus, it is intended that the present invention cover these modifications and variations provided they come within the scope of the appended claims and their equivalents.

What is claimed is:

1. A brush assembly for an electric motor comprising:
   a base, said base including a member for securing said base with a motor spider assembly;
   a brush housing associated with said base, said housing having first and second open ends;
   a brush, defining a longitudinal axis, movably positioned in said housing between said first and second open ends, and said brush extending from one of said open ends of said housing, said brush including a surface, and a recessed portion, said recessed portion including said surface, a stop adjacent said recessed portion, and said surface being at a desired angle with respect to the brush longitudinal axis;
   a biasing member exerting a substantially constant force directly on said brush surface in the direction of the longitudinal axis for biasing said brush into electrical contact with a commutator; and
   an electrical connector electrically coupled with said brush for electrical connection between the commutator and a power supply.

2. The brush assembly of claim 1, wherein said housing includes an axial slot, said stop projecting into said slot.

3. The brush assembly of claim 1, wherein said surface is at an angle greater than zero degree with respect to a plane tangent the brush axis.

4. The brush assembly of claim 3, wherein said angle is from greater than zero degree to about 40°.

5. The brush assembly of claim 1, wherein said angle is such that said biasing member applies a substantially constant force on said brush as said brush wears during use.

6. The brush assembly of claim 1, wherein said electrical connector being positioned adjacent said surface.

7. The brush assembly according to claim 1, wherein a stop is formed on said brush housing and said brush includes a groove for receiving said stop.

8. A brush for an electric motor comprising:
   a body having a desired configuration adapted for fitting within a brush box, said body defining a longitudinal axis;
   a surface on said body, said surface on a desired angle with respect to a plane transverse to said axis, said surface at a terminal end of said body, said body including a recessed portion and said surface being on said recessed portion;

said angle being greater than zero degree wherein said surface enables a spring force exerted on said surface to be substantially constant along said longitudinal axis and said spring moves on said angled surface as said brush wears;

a stop unitarily formed with said brush, said stop is adjacent said recessed portion.

9. The brush of claim 8, wherein said brush has a desired cross-sectional configuration and said recessed portion is positioned between a pair of members extending from sides of said cross-sectional configuration.

10. The brush of claim 8, wherein said angle is greater than zero degree to about 40°.

11. The brush of claim 8, wherein said stop being continuous with said recessed portion.

12. The brush of claim 8, wherein said recessed portion extending a desired distance across said brush forming a second recess adjacent said recessed portion.

13. The brush of claim 12, wherein an electrical contact is secured with said brush in said second recess.

14. A power tool comprising:

a housing;

a motor in said housing;

an output member for doing work coupled with said motor, said motor including a base, windings, a commutator, a spider, and a brush assembly, said brush assembly including a base, said base including a member for securing said base with a motor spider assembly;

a brush housing associated with said base, said housing having first and second open ends;

a brush, defining a longitudinal axis, movably positioned in said housing between said first and second open ends, and said brush extending from one of said open ends of said housing, said brush including a surface, and a recessed portion, said recessed portion including said surface, a stop adjacent said recessed portion, and said surface being at a desired angle with respect to the brush longitudinal axis;

a biasing member exerting a substantially constant force directly on said brush surface in the direction of the longitudinal axis for biasing said brush into electrical contact with a commutator;

an electrical connector electrically coupled with said brush for electrical connection between the commutator and a power supply; and a power source to drive said motor.

* * * * *